March 27, 1934.  F. A. MADDEN  1,952,447
VENDING MACHINE
Filed April 24, 1931   8 Sheets-Sheet 4

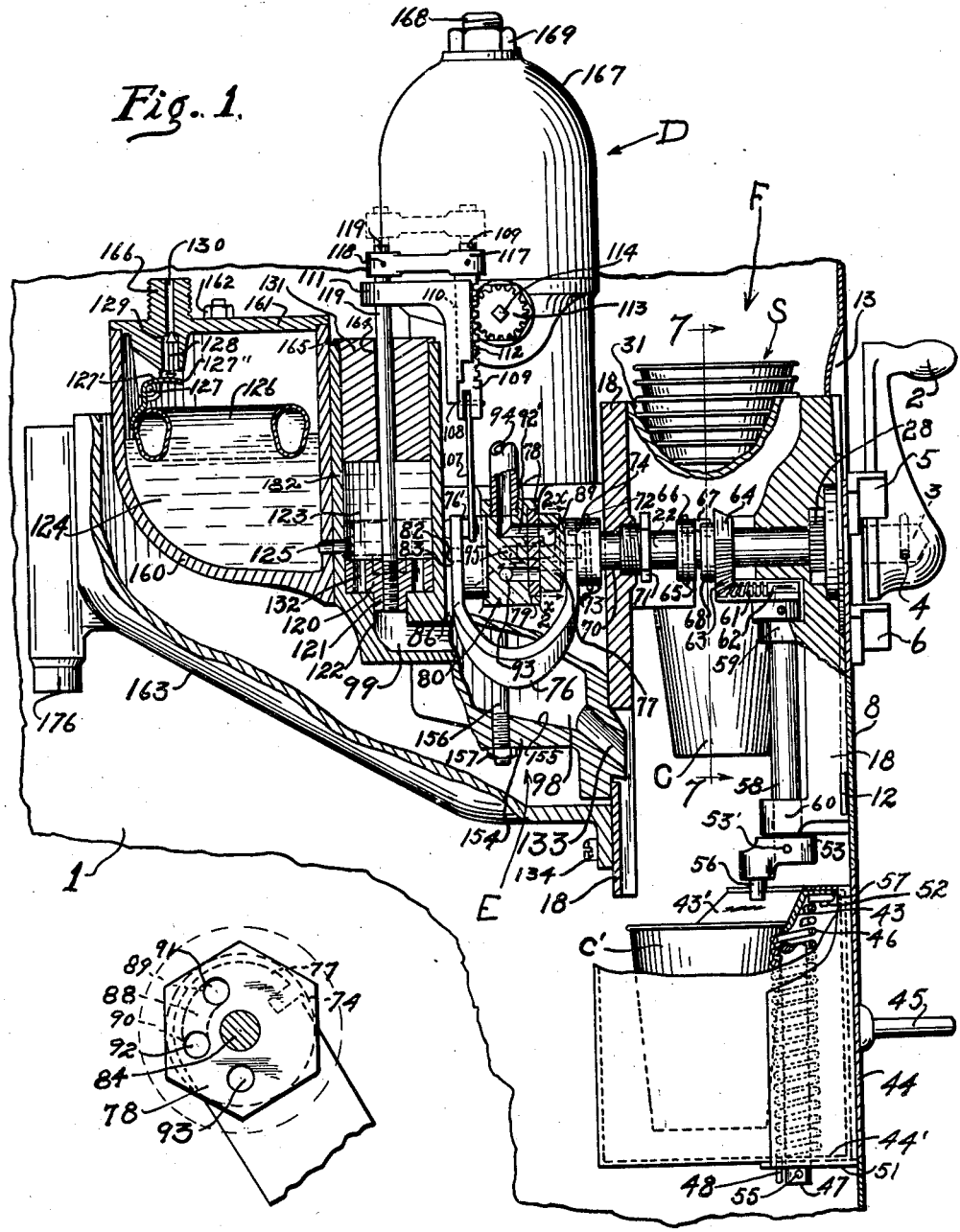

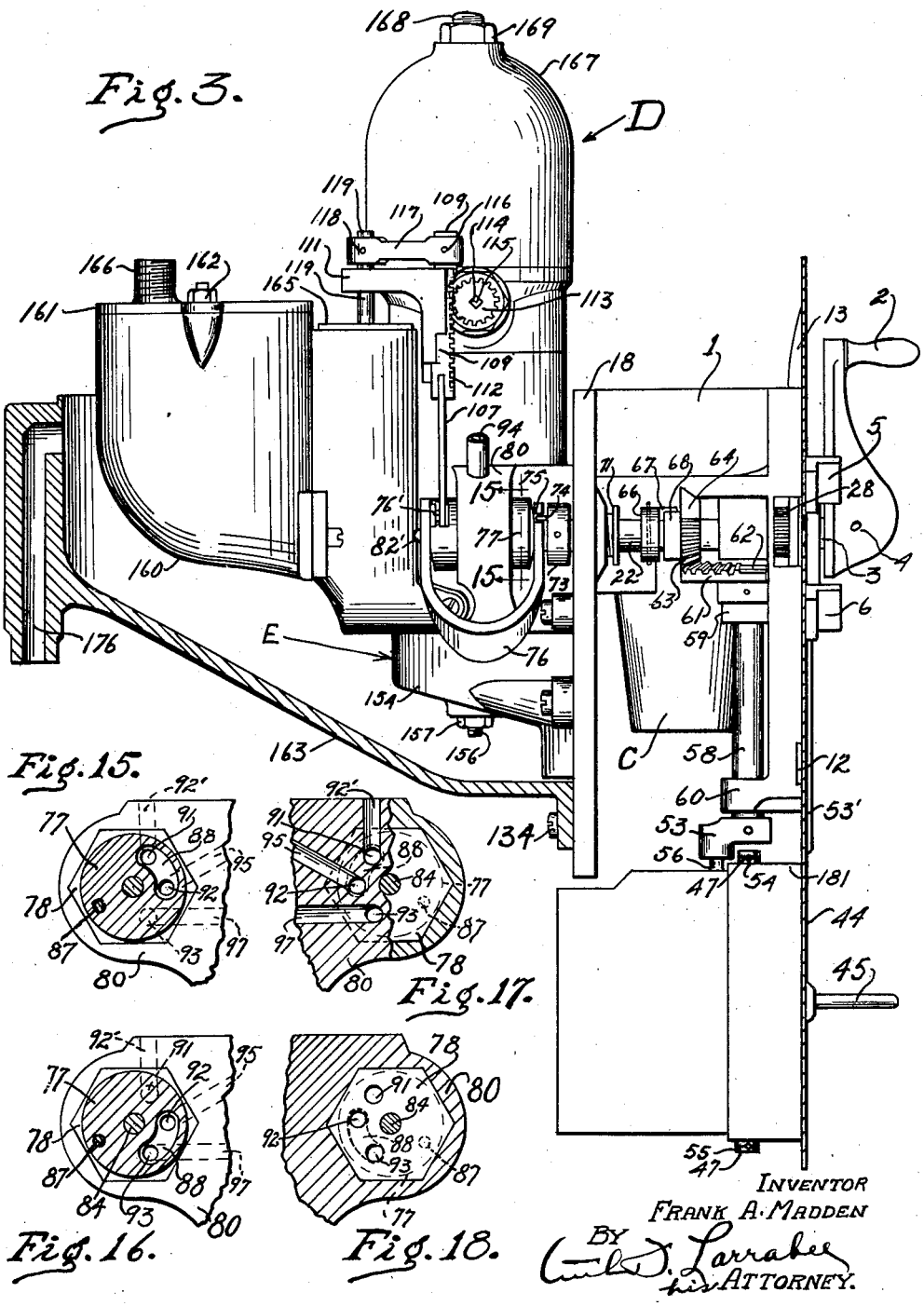

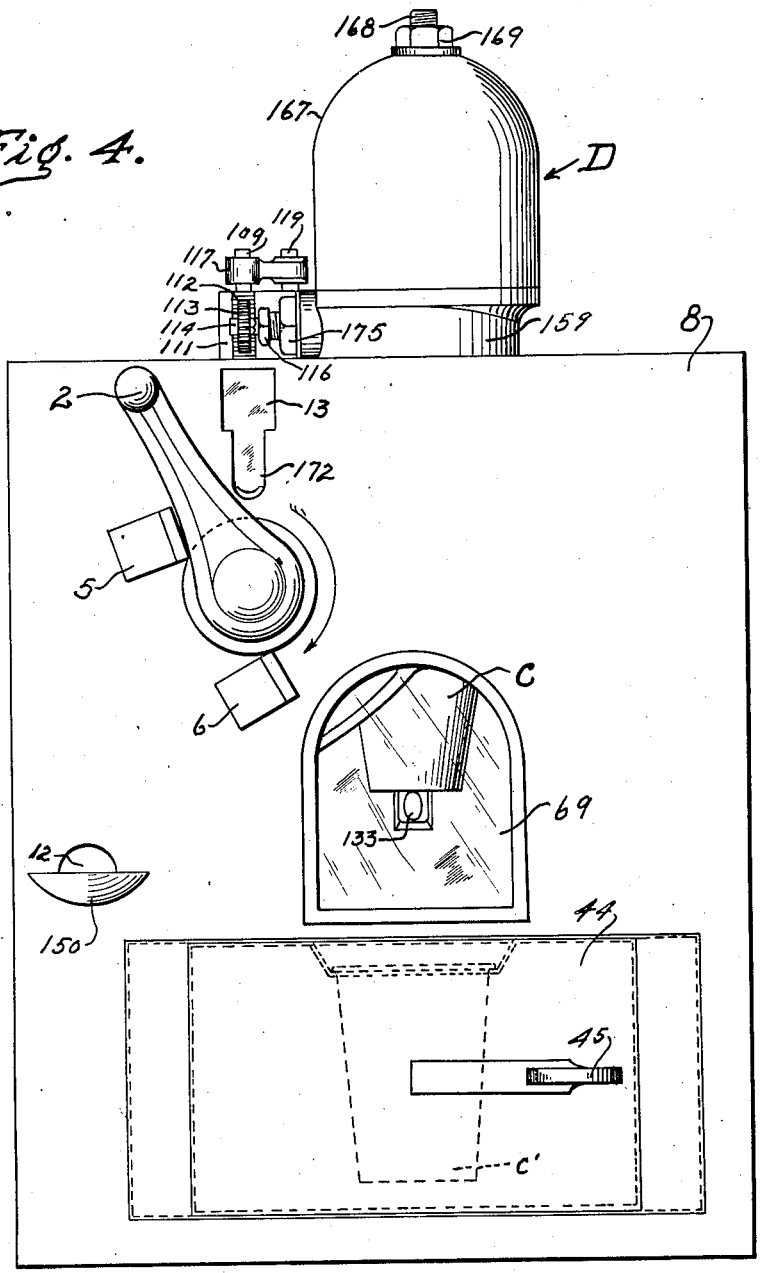

INVENTOR.
FRANK A. MADDEN
BY
his ATTORNEY.

March 27, 1934.　　F. A. MADDEN　　1,952,447
VENDING MACHINE
Filed April 24, 1931　　8 Sheets-Sheet 6

INVENTOR.
FRANK A. MADDEN
BY
his ATTORNEY.

March 27, 1934.  F. A. MADDEN  1,952,447
VENDING MACHINE
Filed April 24, 1931   8 Sheets-Sheet 7
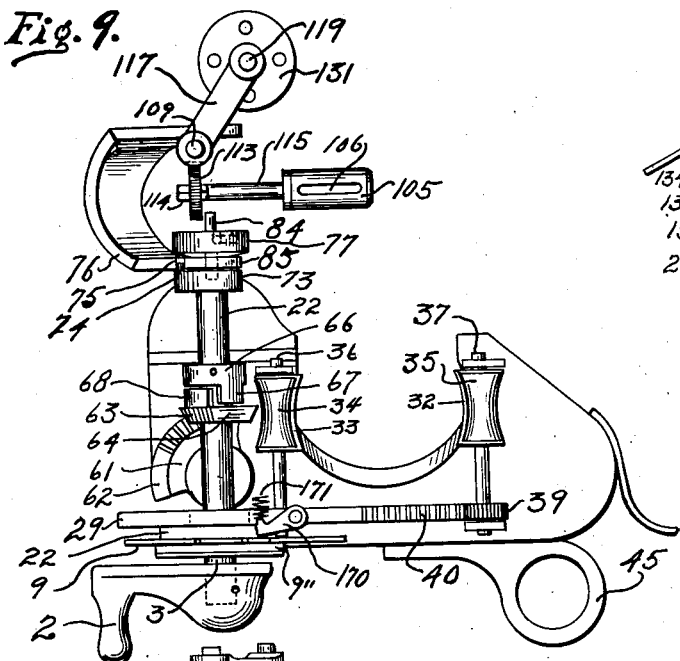
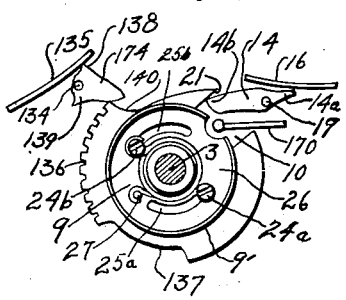
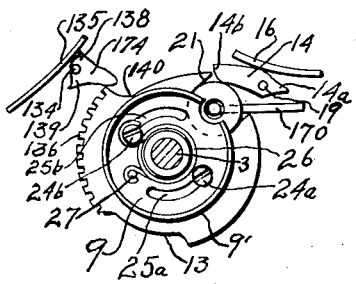
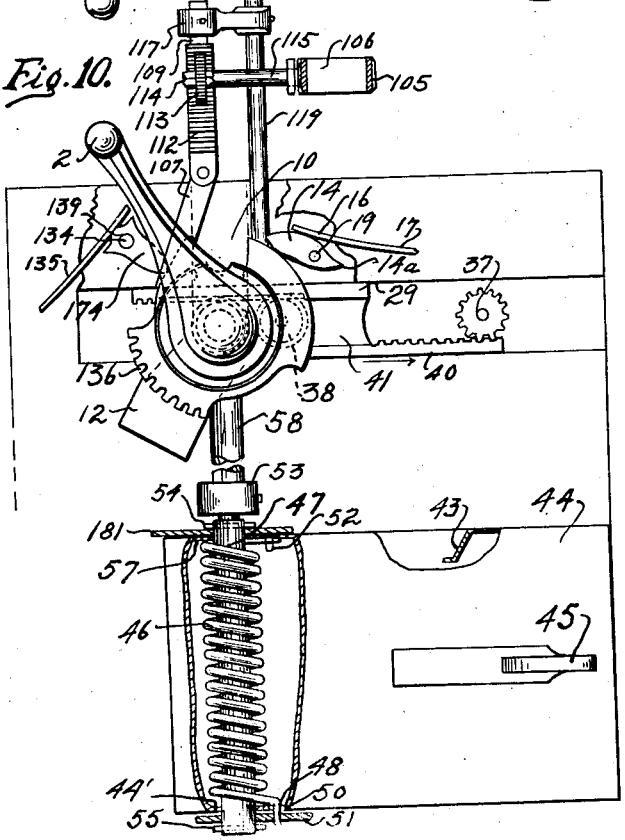
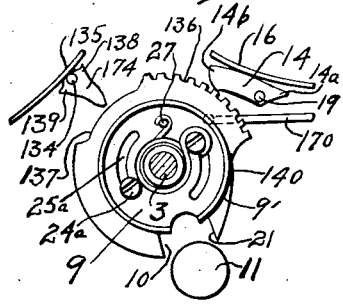
INVENTOR.
FRANK A. MADDEN
BY
ATTORNEY.

March 27, 1934.  F. A. MADDEN  1,952,447
VENDING MACHINE
Filed April 24, 1931   8 Sheets-Sheet 8
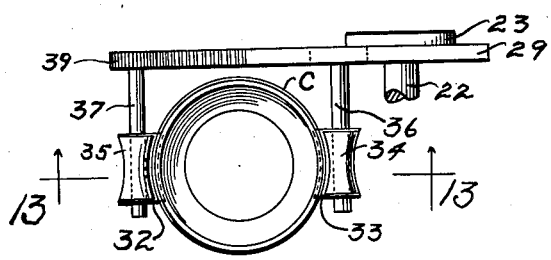
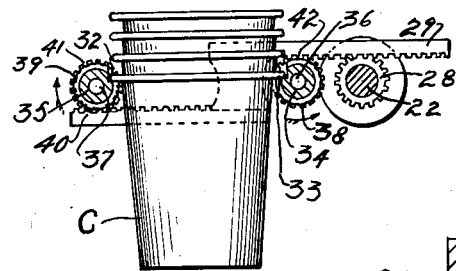
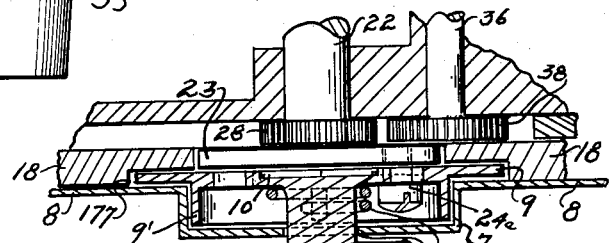
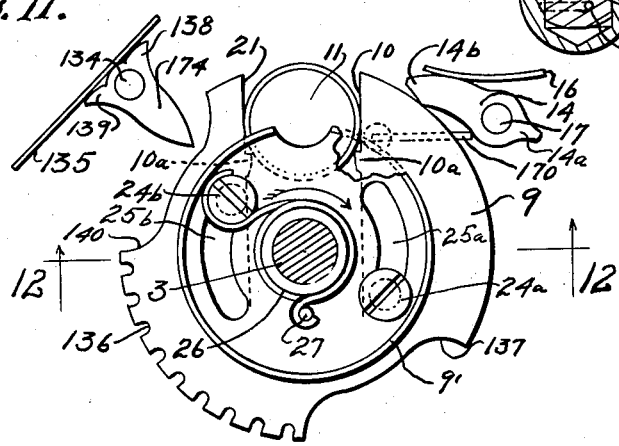
INVENTOR.
FRANK A. MADDEN
BY
his ATTORNEY.

Patented Mar. 27, 1934

1,952,447

UNITED STATES PATENT OFFICE 1,952,447

VENDING MACHINE

Frank A. Madden, Salina, Kans.

Application April 24, 1931, Serial No. 532,430

5 Claims. (Cl. 225—21)

My invention relates to a method of and an apparatus for mixing and vending liquids and especially to machines containing receptacles for liquids, the component parts of beverages, vended as a blended beverage within a vending cup.

An important object of the invention is to provide a more simple and accurate means of mixing, and vending the beverage which is delivered to the vended cup.

Another object is to provide a quicker means of vending a mixed drink, a means that fills the cup immediately when the vending mechanism is operated.

Another object of the machine is to provide a mixed drink of approximately the same degree of carbonation irrespective of whether the carbonated water drum is full and highly carbonated or approximately empty and of relatively low carbonation.

Still another object of the invention is to provide a closed chamber where the beverage is supplied to the vended cup and means for the customer to see the cup filling within the same.

The invention contemplates the use of manually operable, coin-locked mechanism to measure and dispense a beverage within a manually vended cup, said cup being within a closed chamber, and manually operable means actuated by the operator in opening the door of the closed chamber to remove the vended beverage, to return the mechanism to operable position.

Another important novel feature of the invention is that the supply of water under pressure is never in such a relation to the machine that failure to operate or to complete an operation allows the water to escape about loosely fitted valves.

All operations are manual except the operation of the coin dog and the closing of the door of the compartment within which the filled cup is housed.

Considered as a method or art of making a beverage, the invention consists in mixing together in an improved manner a more or less concentrated beverage ingredient, such as a syrup; and a diluting liquid which is thrown into contact with and mixed into said beverage ingredient in a manner to quickly and thoroughly blend these two components of the beverage, the mixture thus formed being created on its way from the sources of supply to a receptacle to contain and deliver the same, the mixed elements being sufficiently retarded during their course to permit a practically complete blending of the two components of the beverage to take place before they reach said receptacle.

The invention will be best understood from a consideration of the following detailed description taken in connection with the accompanying drawings forming part of the specification, with the understanding however that the invention is not confined strictly to the showing in the drawings, but may be modified and changed so long as such changes and modifications are within the scope of the claims appended hereto.

Other objects, advantages and features of my invention may appear from the accompanying drawings, the subjoined detailed description and the appended claims.

The accompanying drawings illustrate the invention in a form I at present deem preferable.

Figure 1 is an elevation of the machine viewed from the left of Fig. 4 with certain parts broken away and other parts shown in vertical midsection to illustrate the internal structure.

Fig. 2 is a fragmentary sectional detail taken on line 2—2 of Fig. 1 showing the water passages in the water valve and leather washer, and also a fragment of the pressure U-spring.

Fig. 3 is a side elevation similar to Fig. 1 except that the sectioning is confined to only a part of the housing.

Fig. 4 is a front elevation of the mechanism with parts dotted in to show their relative positions.

Fig. 9 is a plan view of the shafting and of certain mechanism adjacent thereto.

Fig. 10 is a front elevation of certain working parts closely related to the operating handle.

Fig. 11 is an elevation of the coin-controlled mechanism, the shaft thereof being shown in section, taken on line 11—11 in Fig. 5.

Fig. 12 is a fragmentary sectional plan of the coin mechanism and of a few of the parts related to the cup dispenser, the line 12—12 of Fig. 11 indicating the plane of section.

Fig. 13 is a fragmentary elevation of the cup dispensing mechanism from the rear, the sectioned portion of the view being taken on line 13—13 of Fig. 14, the cups not being sectioned.

Fig. 14 is a plan view of the parts shown in Fig. 13.

Fig. 15 is a diagrammatic view from the front of the valve controlling the charged water supply, taken in motion on line 15—15 in Fig. 3 with the valve in normal rest position.

Fig. 16 is a view similar to Fig. 15 showing the valve in operated position.

Fig. 17 is a view of the same valve from the rear sectioned in two planes disclosing the ports and passages and the hexagonal leather washer, with the parts in normal rest position.

Fig. 18 is a view from the rear of the same valve, partly in section showing the hexagonal leather washer and indicating the movable element in operated position.

Fig. 19 is a diagrammatic view of the coin control mechanism from the front, similar to Fig. 11 disclosing the mechanism locked by the locking pawl.

Fig. 20 is a view similar to Fig. 19 disclosing a so-called "trade check" having a hole, occupying the coin slot, and intercepted and locked by the locking catch.

Fig. 21 is a view similar to Fig. 19 showing the mechanism operated normally with a proper coin at its limit of movement, the coin discharging from the mechanism.

Figure 5:
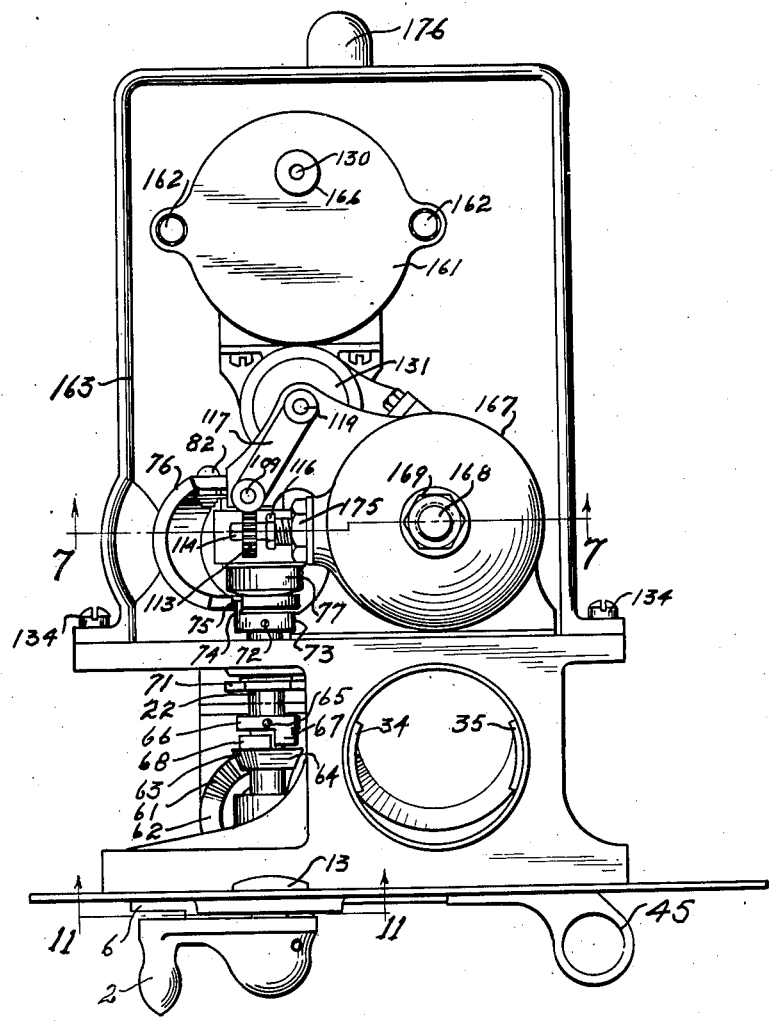
Fig. 5 is a top plan view of the mechanism not showing the stack of cups shown in Fig. 1.

Referring in detail to the drawings and describing first the general arrangement of the different parts of the apparatus, within the left hand portion of the main casing 1 as viewed in Fig. 1 is the syrup containing chamber 124; in the central portion of said casing is the chamber or container D which contains the diluting liquid; between said container D and chamber 124 is located the mixing chamber E which controls the blending together of the contents of the other two chambers, the cup delivery compartment F being located between said handle and the chamber D. The cup delivery mechanism, together with the liquid blending and delivery mechanism, is constructed and arranged to operate, subject to a coin-controlled mechanism, to deposit the cups one at a time in a position beneath the delivery spout 133 to receive the blended liquids, as shown in Fig. 1.

Describing now the mechanism nearest to the operating handle 2 and best shown in Figs. 1, 4 and 12, said handle is fixed to the outer end of stub shaft 3, the handle 2 being shown provided with a socket in one side of the inner end portion thereof, said socket receiving the outer end of the stub shaft 3, and a pin 4 being provided to secure said handle to the outer end of said shaft. The inner end of said stub shaft 3 is secured to the center of the coin plate 9 which is of a generally circular character. To operatively connect said coin plate 9 to shaft 22, plate 9 is provided at opposite sides of the stub shaft 3 with arcuate slots 25a and 25b and through these slots respectively extend screw bolts 24a and 24b, these bolts being screwed into a disk 23 which in turn is secured to the outer end of the main operating shaft 22 (see Fig. 12). Said shafts 3 and 22 are in axial alinement with each other and the shanks of the screws 24a and 24b have a working fit within the arcuate slots 25a and 25b. Therefore, said screws having their heads screwed down to loose contact with the surface of coin plate 9, provides means whereby the stub shaft 3 is operatively attached to the outer end of the main operating shaft 22 and a limited rotary movement is provided between said stub shaft and said main shaft.

The frame casting 18 is provided with a circular seat 177, Fig. 12, which is of slightly greater diameter than the diameter of said plate 9 and which is slightly deeper than the thickness of said plate. The coin plate 9 is provided with a forwardly directed annular flange 9″ spaced inwardly from its periphery, and the front plate 8 is attached to and overlies the frame 18 and also overlies the peripheral portion of said coin plate 9 and has a forwardly projecting section 178 provided with a central bearing opening through which the stub shaft 3 extends. Said section 178 houses the annular flange 9″ of the coin plate together with the parts surrounded by said annular flange 9″.

A relatively weak spring 26 is coiled around the stub shaft 3 adjacent to the coin plate 9, said spring having one of its ends secured to said coin plate 9 by means of a pin 27 and having its other end hooked around the screw 24b. Because of this arrangement the rotation of the stub shaft 3, together with the coin plate 9 attached thereto, will not turn the main shaft 22 until the screws 24a and 24b contact the opposite ends of the slots 25a and 25b through which they extend. If the stub shaft 3 is only rotated the short distance just mentioned, the spring 26 will return it, together with the handle 2, to the original position without disturbing the position of the main operating shaft 22.

Rigidly attached to the outer end of the operating shaft 22 is a gear 28. In mesh with said gear 28 is a gear rack 29 (see Fig. 10). This gear rack 29 driven by the gear 28 operates the cup dispensing mechanism. Within the frame casting 18 is a vertical cylindrical bore or cylinder 31, Fig. 1. Within this bore 31 are nested a stack S of cups, of the usual size and frustro-conical shape with flanged rims slightly spaced apart. See Figs. 1 and 13. Engaging and supporting the rim of the bottom cup C are the cup supporting recesses 32 and 33 cut into the revoluble cup dispensing members 34 and 35. (See Fig. 13.) Said members 34 and 35 are rigidly attached respectively to the shafts 36 and 37. To the shaft 36 is attached rigidly the gear 38 in mesh with the rack 29. (See Figs. 10 and 13.)

To the shaft 37 the gear 39 is rigidly attached. The gear 39 is in mesh with the rack 40. The rack 40 is rigidly attached to the rack 29 by the block 41, Fig. 10. When the racks 29 and 40 are moved by the turning of the handle 2 and the gear 28, the cup dispensing members 34 and 35, Fig. 13, are revolved in opposite directions, i. e. inwardly toward each other as indicated by the arrows, in Fig. 13. The rim supports 32 and 33 are thus revolved from under the rim of the bottom cup C of the stack, allowing it to fall from the stack S of nested cups. The curved supporting surfaces 42 and 42′ are during this operation revolved below the rim of the second cup in the stack and remain so supporting the cup stack until such time as the mechanism is returned to normal position. When the mechanism is returned to normal position the stack of cups drops down and is again supported upon the members 32 and 33 as shown in Fig. 13.

In Fig. 11 a coin 11 is shown resting upon the coin stops 10a. The coin slot 10 is of sufficient dimensions to allow a coin, of the proper value to operate the machine, to enter the coin slot 10 and rest upon the coin stops 10a. A coin of lesser dimensions will fall past the coin stops 10a, by the force of gravity and follow on through the coin groove 10 and leave the mechanism by the coin guide 12 to the coin return cup 150. (Figs. 1 and 4.) The coin was originally deposited in the coin receiving groove 13, Figs. 1 and 4, which connects to the slot 10.

Figure 6:
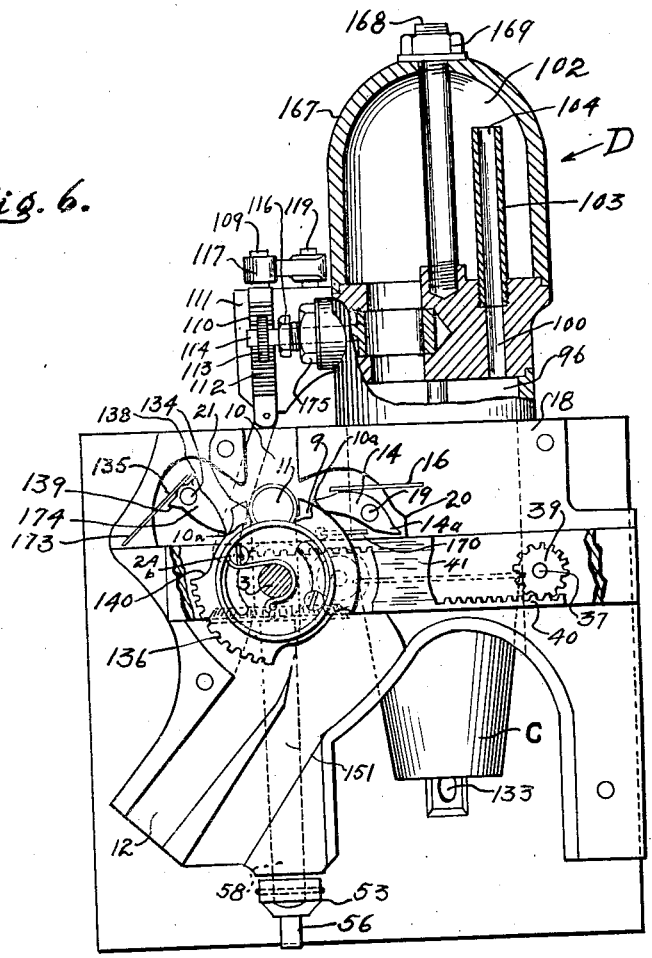
Fig. 6 is a front elevation with the front plate and the vending chamber door and certain adjacent parts removed, other parts being sectioned to show interior construction.

The coin dog 14 is held against the periphery of the coin plate 9 by the tension of the spring 16, anchored in the slot 17 within the frame 18, Figs. 6, 10 and 11. The coin dog 14 is journaled upon the pin 19 which is securely fastened within the frame 18. In case the handle is turned with no coin 11 resting upon the coin stops 10a, the tension of the spring 16 forces said coin dog 14 down until its heel 14a comes in contact with the stop 20, Fig. 10. Further rotation of plate 9 brings the stop 21 against the point 14b of the dog 14 thus stopping further rotation of the coin plate 9, Fig. 19. During the operation of turning the operating handle 2 and the attached coin plate 9 to this position, as described, without a coin 11 resting upon the coin stops 10a, no motion has been imparted to the operating shaft 22 and its attached plate 23, Fig. 12, due to the fact that the coin plate 9 is operatively attached to the operating plate 23 only by the aforementioned screws 24a and 24b, said screws 24a and 24b being free to slide in the curved slots 25a and 25b.

In order to make it impossible for the operator to reverse the direction of rotation of the handle 2 after the same has been moved sufficiently to start the rocking of the operating shaft 22, but insufficiently to complete the oscillation of said shaft, the following construction is provided.

The double-acting pawl 174 with the teeth 136 forms a non-reverse element, best shown in Fig. 6, wherein pawl 174 is pivoted upon the pin 134, and tensioned by the leaf spring 135 secured in a recess 173 in frame 18, pressing upon either the projection 138 or 139 to bring the pawl 174 back to the normal position as shown in Fig. 6. The coin plate 9 is provided with teeth 136. When said coin plate 9 is oscillated by pressure upon the handle 2 the pawl 174 is rocked about the pin 134 to allow the teeth 136 to pass. The teeth 136 and the pawl 174 coming in contact form a non-reverse element and make it impossible to reverse the mechanism until the full oscillation of the mechanism is completed, when the recess 137 in plate 9 will allow the pawl 174 to return to normal position (see Fig. 21); upon the return oscillation of the coin mechanism the pawl 174 is contacted by teeth 136 with a reverse angular relation, thus forming a non-reverse element operating in the opposite direction, until the teeth 136 pass the pawl 174 and recess 140 allows the pawl 174 to return to normal position. To prevent the machine from operating upon the insertion of so-called "trade checks" having a hole in the center, I have provided the latch 170 tensioned by a spring 171 and rockably mounted on the frame 18, see Figs. 9, 19 and 20. The coin slot 13 is provided with a narrow opening 172, Fig. 4, extending downwardly opposite the coin dogs 10a. When a trade check is inserted in the machine, the movement of the coin plate 9 moves the check to present the hole therein to the latch 170 which enters and locks the coin plate 9 against further forward movement. The plate 9 will return to original position upon release of the handle 2, and the check may be removed by use of a suitable instrument through slot 172.

Below the cup stack S, is provided a U-shaped cup catcher or support 43 with circularly disposed supporting lips 43' secured to bracket 57 on door 44, the open portion of the U-shaped opening being directed towards the rear as shown in Fig. 1. In this view the cup C' is shown in position to be filled by the mixed beverage, which operation will be later explained. The cup catcher 43 is rigidly attached to the inner face of door 44 on bracket 57. This door 44, to which is rigidly attached the knob or ring 45, is normally held in the closed position, shown in Figs. 1 and 4, by the tension of the spring 46, an opening 179 being provided for said door through the front plate 18. Said spring 46 is wound around the shaft 47 upon which the door 44 swings. The lower end of the spring 46 extends through a (Fig. 10) groove 50 cut in the bottom plate 180 of the door 44 and is fastened rigidly to the bent-in portion 51 of the front plate 8. Thus the door 44 is free to swing about the stationary end of the spring 46. The top end of the spring 46 is fastened to the door 44 by the pin 52 in bracket 57. The door 44 is journaled on the shaft 47, however, and is hinged upon the same. The groove 50 merely keeps the spring 46, at its anchored end 48, from interfering with the swing of the door 44. The shaft 47 is held in position by the pin 54 in bracket 181 at its upper end and by the pin 55 at its lower end. At its upper end said shaft 47 is held in place by the inward extension 181 of the plate 8, while the aforementioned extension 51 receives the lower part of said shaft 47.

Referring to Figs. 1, 3 and 10, in the front portion of the main casting 18 are provided bearings 59 and 60 within which are journaled the end portions of a vertical shaft 58. To the lower end of said shaft is secured a crank arm 53 by means of a pin 53'. Said crank arm is provided at its outer end with a downwardly extending pin 56 which is positioned to be engaged by the bracket 57 on the door 44. To the upper end of shaft 58 is fixed a mutilated gear 61 by means of a pin. Upon said gear is a convex dwell 62, the toothed portion of the gear not being a complete circle but only a portion thereof. Said gear 61 at times operates a second mutilated gear 63 which is in mesh therewith and which is loosely mounted upon the operating shaft 22. The teeth of said gear 63 do not make a complete circle but terminate in a concave dwell 64. Said dwell 64 does not follow the pitch line of the gear 63, but its surface is concave so that when the convex dwell 62, the surface of which follows the pitch line of the gear 61, and the dwell 64 are in contact, and the dwell 62 is sliding in the dwell 64 which at such times remains stationary, the entire surface of the concave dwell 64 is in contact with the convex dwell 62. This structure holds the extended pitch lines of the mutilated gears 63 and 61 always in contact, or rather tangent to each other, therefore, the gears will always mesh when the operation is reversed.

Rigidly affixed to the operating shaft 22 (Fig. 9) by means of a pin 65 is the collar 66 which is provided with a dog or extension 67 that contacts with another dog or extension 68 with which the gear 63 is provided. There is enough rotational clearance between said dogs 67 and 68 to cause said dogs to just contact with each other at the end of the complete operative oscillation of the shafts 3 and 22 by means of the operating handle 2.

During and following the oscillation of the shaft 22 by the operator a cup C is dispensed from the stack S as previously described and deposited upon the cup receiving lips 43'. The method of measuring and mixing the component liquids of a mixed beverage and depositing the same within the vended cup will be explained later.

A glass window 69, Fig. 4, is provided through which the operator may watch the cup fill. Now in order to obtain the filled cup of vended drink it is necessary for the operator to open the door 44 by placing his finger through and pulling upon the attached ring 45, since the door is held normally closed by the tension of the spring 46 exerted through the pin 52 attached to the door 44.

Since the pin 56 (Fig. 3) is operatively related to the dog 68 through the crank 53, shaft 58 and gears 61 and 63, it follows that, during the operation of opening the door to obtain the vended cup and its contained beverage, the shaft 22 and its attached members are returned to the original or normal position by the operator in opening the door 44 to obtain the vended beverage. This operation will be understood by comparing the disclosure made by Figs. 1, 3 and 9. Referring to Figs. 1 and 3, the shaft 47 about which the door 44 swings is located nearer to the observer than is the shaft 58 which is turned by the opening movement of said door, and the pin 56 of the crank 53 is farther from the observer than said shaft 58. Hence, the opening movement of the door 44 will rock the shaft 58 in a clockwise manner as viewed in plan, with the result that the gear 64 will be rotated in a counter-clockwise manner as viewed from the front of the machine and will, by means of its dog or extension 68, cooperate with the extension 67 of the gear 66 to rock the operating shaft 22 back in a counter-clockwise direction to its original position.

Since all operators might not open the door completely and thus not return the shaft 22 to the same original position, the teeth of gear 61 terminate in the convex dwell 62 and the teeth of gear 63 terminate in the concave dwell 64. These dwells are so timed that they come in contact when the shaft 22 and its connected members have been returned to normal or operable position as shown in Fig. 1. This is accomplished before the door 44 has been sufficiently opened to allow the operator to remove his vended beverage. During the rest of the operation of opening the door the surface of the convex dwell 62 merely slides in the surface of the concave dwell 64 and the dwell 64 is held stationary by the contacting surfaces of the dwells. This effect is obtained by having the surface of the dwell 64 concave that it conform to the convex surface of the dwell 62.

The operating shaft 22 is journaled in the bearing 70 at the back surface of the frame 18 (Fig. 1) of the cup-containing compartment F. This bearing is made water-tight by the packing gland 71. Attached to the rear end of shaft 22 by the pin 72 is the collar 73. Extending from the collar 73 is the dog 74, Fig. 3, contained within a groove or depression 75 in the upper edge of the U-spring 76. Said U-spring exerts a tension against a charged water control valve 77 holding the hexagonal valve washer 78 tightly within its seat 79 within the valve case 80. This tension is obtained by springing the U-spring 76 over the spacing block 81 and the valve 77. The U-spring is held in position by the pin 82 extending through a hole 83 in the rear arm of the U-spring and the pin 84 extending through the hole 85 in the front arm of the U-spring. The pin 84 (see Fig. 2) also extends through the valve 77 and the valve washer 78, said pin being journaled in the bearing 86, Fig. 1. A pin 87 extends through the front arm of the U-spring 76 and the valve 77 eccentrically of said valve. Thus the valve 77 is revolubly attached to the operating shaft 22 through the connecting members 72, 73, 76, 84 and 87.

Within the turnable valve 77 (see Figs. 15 and 16) is an arcuate passage-way or bore 88 having the ports 89 and 90 communicating with its ends. The stationary valve washer 78 contains the ports 91, 92 and 93 (see Fig. 17). The port 91 in the valve washer 78 is in alinement with a bore 92' within the valve case 80, Figs. 1 and 7. Said bore 92' is connected by means of pipe 94 to a supply of liquid under pressure, carbonated water or some such part of a blended drink. The port 92 connects with a passage 95, Fig. 7, which opens into a water measuring chamber 96. The port 93' connects to a passage 97 which opens into a mixing chamber 98. The chamber 98 has another passage 99 through its cylindrical wall, said port 99 connecting with a supply of syrup or other gravity fed component of the blended beverage to be dispensed, mechanical means being supplied to measure and dispense the same. The inlet end of passage 99 is seen in Fig. 1. Said mechanical means will be more fully described later.

Figure 7:
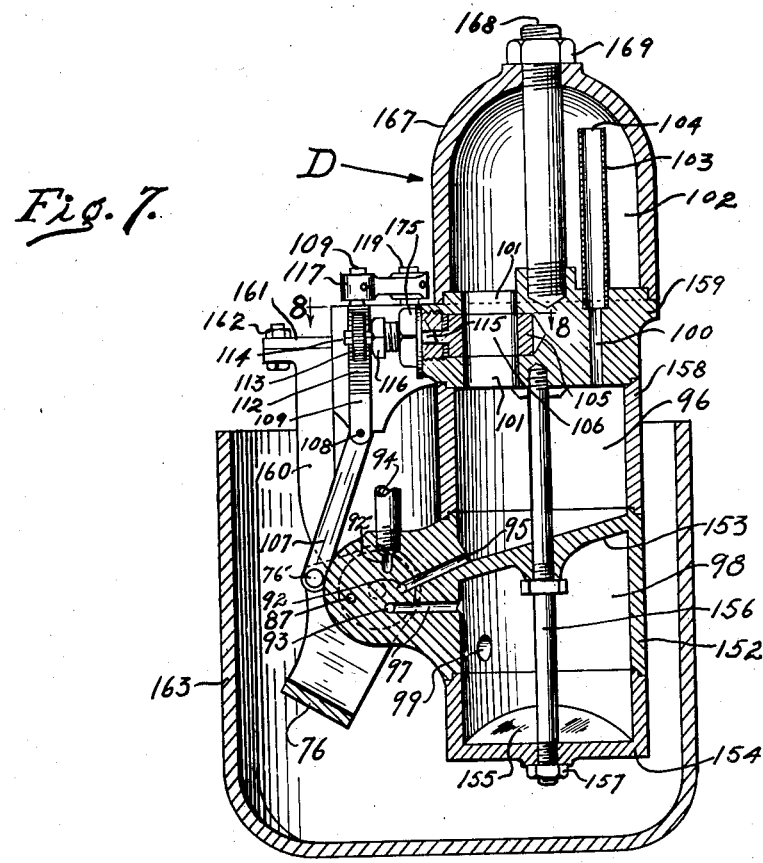
Fig. 7 is a vertical section on line 7—7 of Fig. 5 to show the internal structure of the water measuring valve and chambers.
Figure 8:
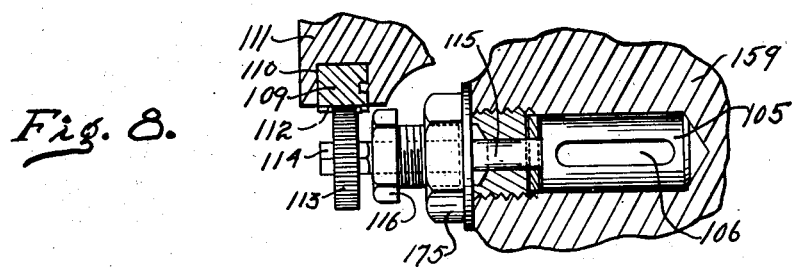
Fig. 8 is a fragmentary section taken on the line 8—8 of Fig. 7 to show more clearly the structure of the water measuring valve.

The recited chambers 96, 98 and a chamber 102 are enclosed in a sectionally assembled casing comprising, as shown in Figs. 1 and 7, the lower supporting base member 154, the casting 152, a third member 158 forming the chamber 96, the valve block 159, and the dome 167 held in assembled relation by bolts 168 and 156.

The port or passage 88 is normally positioned in Figs. 7, 15 and 17 to connect the washer ports 91 and 92, and thus forms a free and open passageway for the diluting liquid under pressure from the source of supply (not shown) from which pipe 94 leads, through the connected ports and passages 92', 91, 89, 88, 92 and 95 to the chamber 96. Above and connected to the chamber 96 by the passages 100 (Fig. 7) and 101 in block 159 is the chamber 102. Connected to the passageway 100 is the standpipe 103 with its contained passage 104 in alinement with the bore 100 and forming a continuous vertical passage extending from the top of the chamber 96 almost to the top of the chamber 102. The chamber 102 is desirably formed under a dome 167 which is held in place by the screw threaded rod 168 and the nut 169. Across the passage 101 is the oscillating valve 105 with its contained passageway 106 normally open in operable position in alinement with the passageway 101 thus when open forming a continuous opening between the chambers 96 and 102. Means are provided to turn the valve 105 through connecting members with the operating shaft 22 and the handle 2 so that in the operated position the valve 105 closes the passageway 101, the only remaining passage between the chambers 96 and 102 being through the standpipe 103.

Attached to the U-spring 76 by the pin 76' is the link 107 (Fig. 3). Slidably supported within the groove 100 of the bracket 111 is the rack 109 (Fig. 6). Said rack 109 is attached at its lower end to the link 107 by the pin 108 (Fig. 3). Upon the forward surface of the bar 109 are the rack teeth 112 in mesh with the gear 113. The gear 113 has a squared hole in the center which fits over the squared portion 114 of the valve stem 115. Said stem 115 is a reduced extension of the valve 105 extending through the packing gland 116. Thus (see Figs. 1 and 7) we have established an oscillating connection between the operating shaft 22 and the valve 105 through the connecting members 22, 72, 73, 74, 76, 106, 107, 108, 109, 112, 113, 114, 115 and 105.

Rigidly attached to the bar 109 by the pin 110 is the arm 117 (Fig. 1) which is fixed to the upper end of the syrup valve rod 119 by the pin 118. The syrup valve 120 is attached to the lower end of said rod 119 by screw threads as shown in Fig. 1. The body portion of said syrup valve 120 has a working fit within the wall of the measuring chamber 123, said valve being provided with an axial downward projection 121 of less diameter than its body portion, said projection having a working fit within a substantially vertical bore 122 which at times affords communication between the measuring chamber 123 and the delivery duct 99 of the syrup chamber 98 (see Fig. 7). The syrup measuring chamber 123 is of the proper diameter and length to accommodate the amount of syrup required to be mixed with the liquid under pressure to make the required quantity of vended drink to fill the vended cup to the proper level.

In order to provide means for predetermining the quantity of syrup which will be delivered from the cylindrical measuring chamber 123 each time the machine is operated, there is removably fitted into the upper portion of said chamber a cylindrical head 131. The maximum quantity of syrup which can be dispensed at a single operation from the apparatus when constructed as shown in Fig. 1 will be the amount which the measuring chamber 123 will contain when a sufficiently short head 131 is fitted into the upper portion of the measuring chamber to permit the liquid level therein to rise to the liquid level permitted by the float in the float chamber 124. As shown in Fig. 1 the head 131 is of sufficient length to restrict the amount dispensed each time to about three-fourths the maximum capacity of the measuring chamber when the float chamber is provided with a float and inlet valve construction like that shown in said view.

A set of different sized heads 131 may be supplied with the apparatus and each of these heads will have extending around its upper end a bead 165 which will rest upon the upper end of the cylindrical wall 183 of the measuring chamber 123.

The syrup measuring chamber 123 (Fig. 1) is connected to a syrup float chamber 124 in casing 160 by a port 125. Within the float chamber 124 the float 126 is tiltingly supported upon the pin 127 by means of an angular rod 127', the lower portion of which is rigidly secured in a suitable manner to one side of the float, said rod having a laterally extending portion 127" which underlies a needle valve 128 in such a manner that when float 126 tilts downwardly said valve opens and when said float tilts upwardly said valve is closed. This valve 128 cooperates with a seat 129 to control the supply of syrup liquid which enters through a passage 164 in the top 161. Said passage 164 is formed within an externally screw threaded extension 130 which may be connected with any suitable source of supply (not shown). Said source of supply may consist of a chamber located at a higher elevation than the chamber 124 in order that the syrup may be supplied by gravity to the latter chamber. The lid or top 161 is secured to the body casing 160 by bolts 162.

The bore 164 through the cylindrical head 131 is somewhat larger than the shaft 119 so that air is not trapped to impede the flow of liquid from the float chamber 124 to the syrup measuring chamber 123 through the port 125.

The main cylindrical body of the syrup valve 120 fits the bore of the syrup measuring chamber with a sliding fit, and it has ports 132 which are normally closed against the bottom surface of the syrup measuring chamber as shown in Fig. 1. Since the syrup valve 120 is attached to the rock bar 109 through the connecting members 116, 177, 188 and 120, when the machine parts are in operated position, see broken lines in Fig. 1, said valve will cover the port 125 and the restricted area 121 will be withdrawn from the bore 122 and the measured quantity of syrup within the measuring chamber 123 will have free gravitational flow through the connected ports 132, 122 and the bore 99 into the mixing chamber 98.

The casing member 163 (Fig. 1), held in place against the main casting 18 by the screws 134, catches the drip from an ice box above, not shown, and in this manner the mechanism is kept cold so that a more palatable drink is served.

Describing other details of construction, the casting 152 (Fig. 7) which forms the mixing chamber 98 is shown provided with an inclined top end wall 153 and with a detachable cup-shaped bottom closure member 154 the interior 155 of which is inclined in such a manner as to direct the mixed liquid towards the discharge passage 133 (see Fig. 1). The bottom member 154 is supported by means of a bolt or screw-threaded rod 156 the upper end of which extends through the wall 153 into block 159 and the lower end of which extends through a bore provided therefor through the center of the bottom member 154, a retaining nut 157 being screwed upon the lower end of said bolt thus to support the bottom member 154 and clamp it securely in place.

The operation is as follows: Assuming the mechanism to be in normal position as shown in Fig. 1, the operator places a coin of proper denomination within the slot 13. The coin, by the force of gravity, follows the slot 13 downward and is retained in the slot 10 in the coin plate 9 by the coin lugs 10a. The operator then turns the operating handle 2 to (Fig. 4) the right from its normal resting place against the stop 5 until said handle comes in contact with the stop 6. During this movement the coin plate 9 (Figs. 6 and 11) turns with the handle 2 and the coin dog 14 is held from contact with the stop 21, Fig. 11, by the coin 11. After the stop 21 passes the free end of the coin dog 14 the dog 174 engages the toothed portion 136 of the coin plate 9 and prevents a premature return movement of the handle. As said handle advances, the screws 24a and 24b and the shaft 22 and its connected members are rotated to the operated position.

There are several simultaneous independent actions during this change from the normal to the operated position which will be individually explained.

*First.*—The coin slot 10 with its contained coin 11 resting upon the coin retaining dogs 10a is vertically reversed so that the coin 11 falls out of the coin slot 10 by the force of gravity and is conducted to a suitable coin receptacle (not shown) by the slot 151, see Fig. 21.

*Second.*—The gear racks 29 and 40 are made to slide to the right, as observed in the drawings, by the action of the gear 28 affixed to the operating shaft 22 and meshed with the gear rack 29. The cup dispensing members 34 and 35 are oscillated by their respective gears 38 and 39 in mesh with the gear racks 29 and 40. The cup supporting surfaces 32 and 33 (see Fig. 13) are removed from below the rim of the bottom cup C while the stack of cups is supported by the surfaces 41 and 42. The bottom cup C drops from the stack and is caught upon the lips 43' secured to the door 44, and assumes the position of the cup C' below the spout 133 and ready to receive the mixed or blended beverage.

*Third.*—The valve 77, Figs. 1, 2, 5 and 7, is rotated upon its leather seat 78 until the port 91 from pipe 94 is closed, and the port 92 from chamber 96 is, by means of the arcuate passage 88, connected to the discharge port 93 and passage 97 which leads to the mixing chamber 98. The valve 105 is closed (see Fig. 7) by the rocking of the U-spring 76 raising the gear rack 112 which is in mesh with the gear 113 affixed to the valve 105. The measured effervescing or pressure liquid normally contained within the measuring chamber 96 now has an open passage through 95, 95', 92, 88, 93 and 97, into mixing chamber 98, Figs. 2 and 7. This measured quantity of liquid is ejected into the mixing chamber by the pressure of the entrapped air and effervesced gases within the chamber 102 through passage 104. The varying excess quantity of liquid within the chamber 102 cannot escape to vary the amount of measured liquid in chamber 96 because the valve 105 is closed and the standpipe vent 104, through which the entrapped air and gases expand to force the liquid from the chamber 96, extends to approximately the top of the chamber 102, therefore only the liquid residing in the chamber 96, which is of a fixed quantity, passes into the chamber 98, is therein mixed with the syrup and discharged to the cup, the flow providing a further mixing process.

*Fourth.*—The syrup valve 120 (Fig. 1) is raised by the action of the members 117 and 119 rigidly affixed to the sliding bar 109 and syrup valve rod 119, until in the operated position the port 125 is closed and the passageways 132, 122, and 99, to the mixing or blending chamber 98 are open allowing the measured quantity of syrup within the measuring chamber to flow by gravity to the mixing chamber 98.

These four operations are simultaneous but it is deemed necessary for clarity of explanation to describe them separately. The syrup and effervescing or pressure fluid mix within the mixing chamber 98 and flow out of the spout 133 and are received within the cup c'. The operator may look through the glass 69, Fig. 4, and watch the cup fill.

The normal or operable positions of the door 44 and its connecting members, 56, 58, 61, and 64, are not disturbed by the rocking of the shaft 22, by the operator, into operated position because the gear 63 is free upon the shaft 22, and the affixed dog 68, Fig. 1, does not come in contact with the dog 67 affixed to the shaft 22 until the shaft 22 is in operated position.

Now the mechanism is at the stage of operation where the shaft 22 and its connected members are in operated position and the door 44 with its connected members is in operable position with a vended cup containing a mixed beverage resting upon the cup supporting lips 43', and the dog 67 attached to the shaft 22 in contact with the dog 68 attached to the gear 63.

The operator in order to obtain his vended drink places his finger through the ring 45 and opens the door 44 and removes the vended cup from the cup support 42 with the other hand. The operation of opening the door to remove the vended cup and drink therefrom, actuates the operating shaft 22 and the handle 2 with all the connected mechanism to quickly return to original position by the action of the dog 67 against the dog 68. The action is so timed that the shaft 22 and connected members are returned to operable position just as the dwell 62 comes in contact with the dwell 64 and starts sliding over it. This contact of dwell 64 and dwell 62 occurs before the door is sufficiently open to allow the drink to be removed by the operator. During the time the operator is removing the vended cup and drink, the chamber 123 refills with syrup since the valve 121 is once more in operable position as shown in Fig. 1. The water measuring chamber refills since the water valve 77 is again in operable position thus opening communication through the pipe 94 and the ports 91, 88, 92, 95, the port 93 being closed. When the operator allows the door 44 and its connected parts to swing shut, as in Fig. 1, under pressure from the coiled spring 46, the operation of vending a mixed drink within a vended cup has been completed and all moving parts have been returned to normal operable position and the mechanism is ready for a second operation.

From an inspection of Figs. 1 and 7, it will be seen that the outlet of the syrup discharge passage 99 is greater than the final discharge passage 133 and that the passage 97 which delivers the diluting liquid under pressure to the mixing chamber is smaller than said syrup discharge passage 99. The result of this arrangement is that the syrup ingredient and the diluting ingredient do not immediately pass from the vending chamber, but owing to the restricted nature of the discharge outlet 133, there is a temporary accumulation within the mixing chamber 98 of the two liquid ingredients being blended therein. This fact, together with the fact that the diluting liquid is ejected under considerable force, will cause an agitation within the blending chamber which will thoroughly mix the contents thereof before they are delivered through the discharge outlet 133 to the cup C'.

Heretofore in the art, difficulty has been met with in the manufacture of a charged water measuring and dispensing mechanism which would be sealed against escape of the water at certain periods of operation. To this end I have provided the charged water mechanism disclosed, in Figs. 1, 7, 15, 16, 17 and 18, in which the chambers holding the immediate supply of such water for dispensing purposes are cut off from the source of supply upon the operation of the machine, and wherein should the operation of the machine cease at any point during that operation the source of supply remains effectively cut off from the said chambers; and for this purpose I have provided the recited valve 77 wherein the source of supply of charged water is positively cut off from the said chambers before the said chambers are connected to a discharging means; and the reverse is true in the return movement of the valve, the discharge means is disconnected from the said chambers before the chambers are connected to the source of supply of charged water.

Heretofore in the art it has been customary in this type of vending machine to continue and complete certain operations automatically after they have been instituted manually, and difficulty has been met with in failure of such automatic means to always properly function; therefore I have provided that all operations of this machine be performed manually, thus forcing the purchaser of a drink to fully and completely operate the machine to vend the drink by manual means, and then to return the operative parts of the machine to original normal position by the manual operation of the purchaser, but putting these manual operations in such form that the purchaser is not conscious of any load of work being imposed on him.

It being desirable to furnish the vended drink as cold as possible, I would include in my commercially manufactured machines, an ice box, not shown, above the drink mixing mechanism, and the melted ice water would run into the open-top pan 163 (Fig. 3) which surrounds the syrup and charged water chambers and mixing mechanism, thus keeping the parts and their contents cool, and for the overflow from the pan 163 I have provided a discharge passage 176 which may be extended to any desirable vessel not shown.

It will be observed that the form of construction disclosed provides for the more cleanly and sanitary handling of a food product in that all parts which contact the food product are protected from contact with dust or dirt, the spring actuated door 44 normally remaining closed protects the enclosed parts from the outer air; and it is felt that this type of construction will fully meet the laws and ordinances regarding dispensing of food products.

The construction and arrangement of parts herein disclosed constitutes a preferable form of my invention, but it is to be understood that modifications will of necessity have to be made to form the invention into a commercial machine, such modifications to come within the scope of the appended claims.

I claim:

1. In a beverage vending machine, comprising, a mixing chamber; a syrup supply chamber to supply measured amounts of syrup to said mixing chamber; a chamber to supply measured amounts of diluting liquid to said mixing chamber including means to replenish the supply of liquid to said chamber; valves to control communication between said mixing chamber and said other two chambers; intermediate mechanism operatively connected to operate said valves simultaneously; means to control said diluting liquid including a control valve having ports located at different radial positions with respect to the axis of said valve; a gasket located axially of said valve to afford fluid tight connections; and a U-spring having the end portion of its limbs in axial alinement with said valve and operatively related thereto, said U-spring being positioned to hold said gasket against said valve with sufficient tightness to prevent leakage.

2. In a beverage vending machine, the combination of an ingredient supply chamber to supply syrup or other beverage ingredient; an ingredient measuring chamber normally in communication with said ingredient supply chamber; valvular means to control the emptying and filling of said measuring chamber; a manually rockable shaft to operate said valvular means; a cup support attached to a spring tensioned door; cup delivery means operatively related to said shaft to deliver cups to said cup support in a position to receive liquid discharged from said measuring chamber; a door providing access by opening to filled cups supported by said cup support; said shaft having a dog element fixed thereto; a gear loosely mounted on said shaft adjacent to said dog element, said gear being provided with a second dog element, to cooperate with the first recited dog element; and means operatively relating said gear to said door whereby the opening movement of said door causes said dogs to cooperate to reverse the rotation of said shaft and thereby restore the valvular means to its normal position.

3. In a beverage vending machine, the combination with a chamber containing a liquid beverage ingredient; valvular means to control the delivery from said chamber of the liquid contained therein; a manually turnable shaft to operate said valvular means; of means to support a stack of cups; means operatively related to said shaft to deliver a cup from said stack of cups to a position for receiving the beverage released by the operation of said valvular means; means to reverse said operating mechanism comprising a door, the opening of which affords access to the filled cups, a rotatable member loosely mounted on said shaft, said rotatable member being provided with a dog element engageable with a portion of said shaft, and operating means relating said rotatable member with said door to cause an opening operation of said door to reverse the rotation of said shaft and thereby restore said valvular means to the normal position.

4. In an effervescent liquid measuring device, valve controlled inlet and outlet connections; a measuring chamber with a pressure chamber connected thereto; said connection comprising a relatively small passage, and a larger valve controlled passage; operating mechanism adapted to operate said valves simultaneously; means for discharging a measured amount of liquid therefrom under accumulated pressure including the closing of the valve controlled passage against the passage of liquid from said pressure chamber, and the automatic exhaustion of accumulated gases therein through the recited smaller passage.

5. In a drink vending machine, means for delivering an effervescent liquid measured under pressure comprising a measuring chamber having a connecting passage, and a pressure chamber; a valve to partially separate said chambers for measuring purposes; a valve to alternately connect said measuring chamber passage to a source of supply and to a mixing and delivery means.

FRANK A. MADDEN.